(12) United States Patent
Wouhaybi et al.

(10) Patent No.: US 9,985,797 B2
(45) Date of Patent: May 29, 2018

(54) APPLIANCE STATE RECOGNITION DEVICE AND METHODS

(71) Applicant: Intel Corporation, Santa Clara, CA (US)

(72) Inventors: Rita H. Wouhaybi, Portland, OR (US); Mark D. Yarvis, Portland, OR (US); Bradut Vrabete, Sixmilebridge (IE)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/281,912

(22) Filed: Sep. 30, 2016

(65) Prior Publication Data

US 2018/0097652 A1    Apr. 5, 2018

(51) Int. Cl.
*G05B 15/02* (2006.01)
*H04L 12/28* (2006.01)

(52) U.S. Cl.
CPC .......... *H04L 12/2823* (2013.01); *G05B 15/02* (2013.01); *H04L 12/282* (2013.01); *H04L 12/2816* (2013.01); *H04L 12/2829* (2013.01); *H04L 2012/285* (2013.01)

(58) Field of Classification Search
CPC .................................................. H04L 12/2823
See application file for complete search history.

(56) References Cited

U.S. PATENT DOCUMENTS

| | | | |
|---|---|---|---|
| 9,273,878 B2 * | 3/2016 | Kucera | ................ F24F 11/0009 |
| 2006/0202848 A1* | 9/2006 | Volodarsky | ............. F24C 7/082 |
| | | | 340/654 |
| 2008/0125911 A1 | 5/2008 | Ebrom et al. | |
| 2010/0138363 A1 | 6/2010 | Batterberry et al. | |
| 2013/0110621 A1 | 5/2013 | Gupta et al. | |

(Continued)

FOREIGN PATENT DOCUMENTS

KR    10-2012-0111330 A    10/2012

OTHER PUBLICATIONS

Samsung, "SmartSense Multi Sensor," SmartThings Support, Things, SmartSense and SmartPower, website: https://support.smartthings.com/hc/en-us/articles/200903230-SmartSense-Multi-Sensor, 2015.

(Continued)

*Primary Examiner* — Joseph Feild
*Assistant Examiner* — Pameshanand Mahase
(74) *Attorney, Agent, or Firm* — Schwabe, Williamson & Wyatt, P.C.

(57) ABSTRACT

Embodiments herein relate to recognition of an appliance state based on sensor data and determination of a response based at least in part on the appliance state. In various embodiments, an apparatus to recognize an appliance state may include a sensor data module to identify sensor data in one or more signals relating to data from one or more sensors associated with an appliance, an appliance state recognition module to determine an appliance state of the appliance based at least in part on the sensor data, a response module to determine a response based at least in part on the appliance state, and a transmission module to send the response to at least one of an appliance controller for the appliance or a presentation device. Other embodiments may be described and/or claimed.

23 Claims, 7 Drawing Sheets

(56) References Cited

U.S. PATENT DOCUMENTS

2015/0293511 A1\* 10/2015 Laufer ............... G08B 7/06
                                                    700/275
2015/0358218 A1\* 12/2015 Nasir ............ H04L 41/5025
                                                    709/224
2016/0035052 A1    2/2016 Tran
2016/0036958 A1\*  2/2016 Logan ............ G05B 19/042
                                                    455/414.1
2017/0059743 A1\*  3/2017 Haupt ............... G01D 7/00

OTHER PUBLICATIONS

Bob Yirka, "Successful Kickstarter project Neurio now delivering home electricity sensing," TechXplore, webstie: https://techxplore.com/news/2015-05-successful-kickstarter-neurio-home-electricity.html, May 26, 2015.

International Search Report and Written Opinion dated Dec. 4, 2017 for International Application No. PCT/US2017/048942, 17 pages.

\* cited by examiner

APPLIANCE STATE RECOGNITION DEVICE AND METHODS

FIELD

Embodiments of the present disclosure generally relate to the field of appliances and, more particularly, to recognition of appliance states based at least in part on sensor data.

BACKGROUND

A variety of appliances require a user to interact with the appliance to complete a particular objective such as washing and drying clothes or washing dishes. Although some smart appliances allow their users to monitor and interact with them remotely, there is a large installed base of legacy appliances that do not include such functionality. Additionally, even for the newer smart appliances, the applications associated with them are limited in their functionality with respect to prediction of user behavior and optimized appliance usage.

BRIEF DESCRIPTION OF THE DRAWINGS

Embodiments of the appliance state recognition devices and methods of the present disclosure may overcome these limitations. The techniques will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
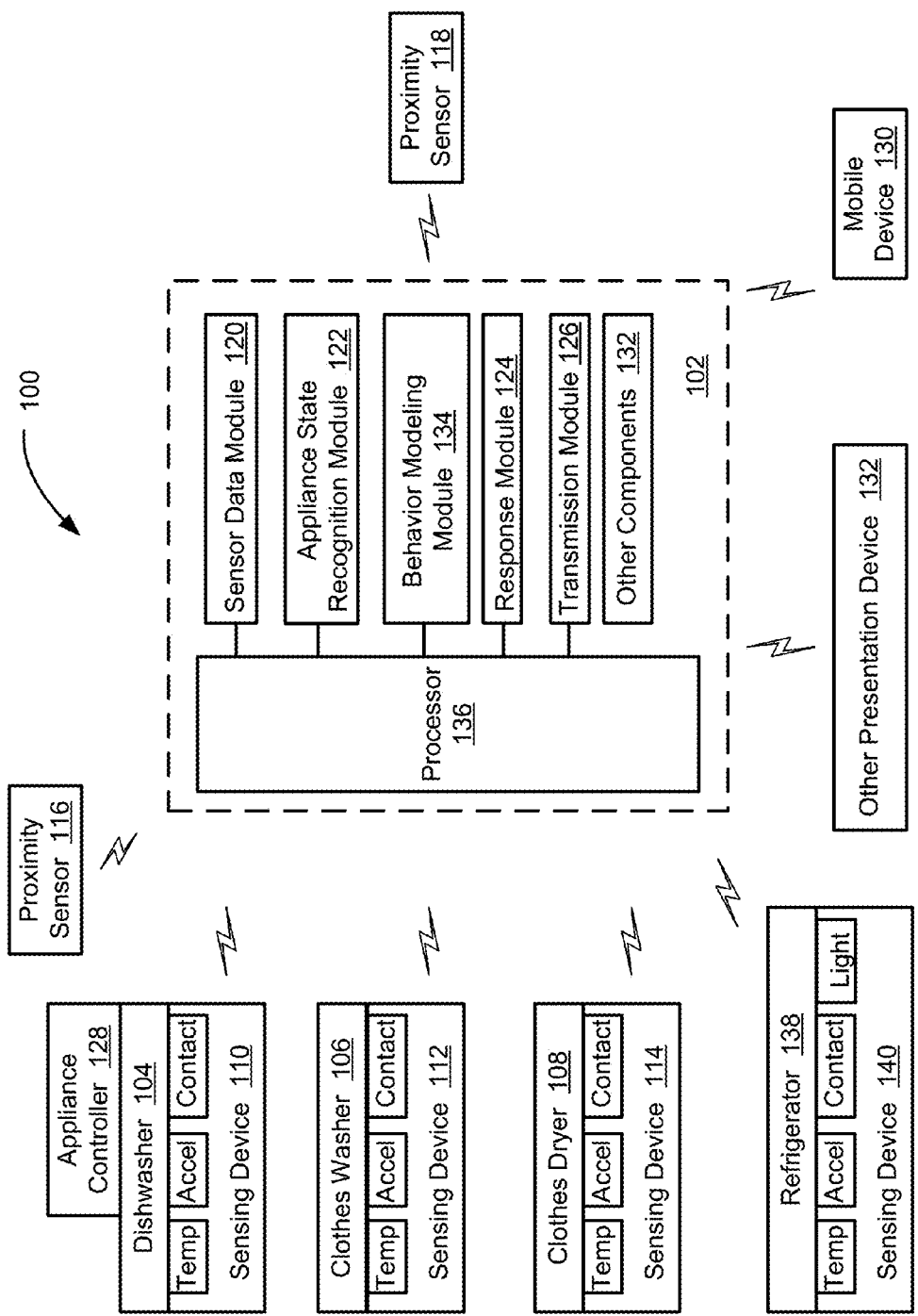
FIG. 1 is a block diagram of an operating environment for an appliance state recognition apparatus, according to various embodiments.

Embodiments of the present disclosure describe devices, systems, and techniques to recognize appliance states and determine responses based at least in part on sensor data. In various embodiments, an apparatus to recognize an appliance state may include a sensor data module to identify sensor data in one or more signals relating to data from one or more sensors associated with an appliance, an appliance state recognition module to determine an appliance state of the appliance based at least in part on the sensor data, a response module to determine a response based at least in part on the appliance state, and a transmission module to send the response to at least one of an appliance controller for the appliance or a presentation device and/or to send a notification to a user.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an operating environment 100 for an appliance state recognition apparatus 102, according to various embodiments. In some embodiments, the apparatus 102 may be in signal communication with one or more sensing devices that may be associated with one or more appliances. In the example shown, a dishwasher 104, a clothes washer 106, and a clothes dryer 108 may be associated with a first sensing device 110, a second sensing device 112, and a third sensing device 114, respectively. In some embodiments, one or more of the sensing devices may include more than one sensor and/or type of sensor. In various embodiments, each of the sensing devices 110, 112, and 114 may include a temperature sensor and a motion sensor (e.g., an accelerometer), shown as Temp and Accel respectively. In various embodiments, one or more of the sensing devices 110, 112, or 114 may include a contact sensor, shown as Contact, that may provide an indication of an open/closed state of an appliance door. In some embodiments, more than one sensing device may be associated with a single appliance. In various embodiments, each sensing device may include a different number of sensors, such as a single sensor. In some embodiments, the dishwasher 104 may be located in a kitchen of a home and the clothes washer 106 and/or clothes dryer 108 may be located in a laundry room, kitchen, or other area of a home. In other embodiments, the appliances may be situated in a location other than a home, such as in an institutional building or an industrial setting.

In some embodiments, the first sensing device 110 may be mounted on a door of the dishwasher 104, the second sensing device 112 may be mounted on a door of the clothes washer 106, and the third sensing device 114 may be mounted on a door of the clothes dryer 108. In various embodiments, one or more proximity sensors may be located in a building where the appliances are located. A first proximity sensor 116 may be near the appliances and/or a second proximity sensor 118 may be positioned in an entryway of the building in various embodiments. In some embodiments, the building may be a home and the appliances may be home appliances.

In various embodiments, the apparatus 102 may include a sensor data module 120, an appliance state recognition module 122, a response module 124, and a transmission module 126. In some embodiments, the sensor data module 120 may be to identify sensor data in one or more signals relating to data from one or more sensors associated with an appliance (e.g., temperature, accelerometer, and/or contact sensors of sensor devices 110, 112, 114). In various embodiments, the sensor data module 120 may log and/or aggregate data from one or more sensors for later use by the sensor data module 120 and/or other modules.

In various embodiments, the appliance state recognition module 122 may be to determine an appliance state (e.g., not full, full, running, and/or done dishwasher appliance states) of the appliance based at least in part on the sensor data. In some embodiments, determining the appliance state may include detecting an appliance state. In some embodiments, the appliance state recognition module 122 may be to determine the appliance state based at least in part on one or more of accelerometer or temperature data. In various embodiments, the appliance state recognition module 122 may be to determine the appliance state based at least in part on first temperature data from a first temperature sensor (e.g., temperature sensor of sensor device 110) and second temperature data from a second temperature sensor (e.g., temperature sensor of sensor device 112 or 114). In some embodiments, the appliance state recognition module 122 may be to determine the appliance state based at least in part on a probabilistic model. In various embodiments, the appliance state recognition module 122 may be to detect a door opening motion and/or determine an open door time duration based at least in part on the sensor data. In some embodiments, the appliance state recognition module 122 may be to determine the appliance state based at least in part on the open door time duration.

In some embodiments, the response module 124 may be to determine a response based at least in part on the appliance state. In some embodiments, determining a response may include developing and/or assembling a response. In various embodiments, the response module 124 may be to determine the response based at least in part on proximity data from one or more of the first proximity sensor 116 and/or the second proximity sensor 118 and based at least in part on the appliance state. In some embodiments, the presence of a user in a home may be detected by the second proximity sensor 118 and/or the presence of a user near an appliance may be detected by the first proximity sensor 116, and the response module 124 may generate a response based at least in part on the detected presence of a user. In some embodiments, the response may be a recommendation for a user action (e.g., unload dishwasher, move clothes to dryer).

In various embodiments, the transmission module 126 may be to send the response to at least one of an appliance controller for the appliance, such as appliance controller 128 associated with the dishwasher 104, or a presentation device such as a mobile device 130 (e.g., a smartphone) or other presentation device 132 (e.g., a display on a refrigerator, visual output on a counter, or an audio device such as a speaker). In some embodiments, one or more appliance controllers, not shown for clarity, may be associated with the clothes washer 106 and/or the clothes dryer 108. In some embodiments, the response may be a notification that may be sent to a user (e.g., a message to mobile device 130).

In some embodiments, the apparatus 102 may also include a behavior modeling module 134. In various embodiments, the behavior modeling module 134 may be to determine a user behavior profile based at least in part on usage of the appliance (e.g., time of day a user typically runs or never runs the appliance). In some embodiments, the response module 124 may be to determine the response also based at least in part on the user behavior profile.

In some embodiments, the apparatus 102 may include a processor 136. In various embodiments, one or more of the sensor data module 120, the appliance state recognition module 122, the response module 124, the transmission module 126, and/or the behavior modeling module 134 may be operated on the processor 136. In various embodiments, one or more of the sensor data module 120, the appliance state recognition module 122, the response module 124, the transmission module 126, and/or the behavior modeling module 134 may be implemented in hardware, firmware, a field programmable gate array (FPGA), an ASIC, or some combination thereof. In some embodiments, one or more of the sensor data module 120, the appliance state recognition module 122, the response module 124, the transmission module 126, and/or the behavior modeling module 134 may be operated on one or more processors in a platform arrangement. In various embodiments, the sensor data module 120 may be a sensor data identifier, the appliance state recognition module 122 may be an appliance state detector, the response module 124 may be a responder, the transmission module 126 may be a transmitter, and/or the behavior modeling module 134 may be a behavior modeler. In some embodiments, the processor 136 and/or one or more of the sensor data module 120, the appliance state recognition module 122, the response module 124, the transmission module 126, or the behavior modeling module 134 may be located in the same setting or building as the appliances. In other embodiments, one or more of the processor 136 and/or the modules may be located in a different setting or building as the appliances. In some embodiments, sensor data from one or more of the sensors may be routed through a gateway (not shown for clarity) to one or more processors and/or modules located in a remote setting such as a cloud computing system. In various embodiments, the apparatus 102 may include one or more other components 138. In some embodiments, the apparatus 102 may be in wireless signal communication with one or more of the sensing device 110, the sensing device 112, the sensing device 114, the proximity sensor 116, the proximity sensor 118, the mobile device 130, or other presentation devices 132.

In various embodiments, a refrigerator 138 may be associated with a fourth sensing device 140. In some embodiments, the fourth sensing device may include a light sensor, shown as Light, that may provide an indication of whether a light associated with the refrigerator is on or off. In some embodiments, a freezer or a beverage cooler, not shown for clarity, may be associated with a sensing device that may be configured similarly to the fourth sensing device 140. In some embodiments, the refrigerator 138, freezer, or beverage cooler may be a commercial appliance given away by a fleet operator or a brand in return for use of the appliance according to a set of agreed terms such as being kept in a particular location, kept in a correct operating range, and stocked with agreed products. In other embodiments, the refrigerator 138, freezer, or beverage cooler may be a home appliance. In various embodiments, rather than using the fourth sensing device 140 that may have multiple sensors, multiple sensing devices, each with a different number of sensors, such as a single sensor, may be associated with the refrigerator 138.

In various embodiments, indirect information (e.g., sensor data) from the fourth sensing device 140 may be used by the apparatus 102 to infer measurements of importance. In some embodiments, the apparatus 102 may determine whether the refrigerator 138 is switched on or off based at least in part on sensor data from the light sensor. In a commercial setting, it may be determined by the apparatus 102 that the refrigerator 138 is switched off in response to sensor data from the light sensor indicating a light associated with the refrigerator 138 is off. In a home setting, it may be determined by the apparatus 102 that a refrigerator door is open in response to sensor data from the light sensor indicating a light associated with the refrigerator 138 is on. In various embodiments, the fourth sensing device 140 may include a microphone, not shown for clarity, to provide sensor data associated with the refrigerator 138 such as the sound of a door opening and/or closing. In some embodiments where the refrigerator 138 may be a commercial refrigerator, the fourth sensing device 140 may be or include a door sensor. In various embodiments, sensor data from the door sensor that may include vibration (e.g., from an accelerometer) and/or sound data (e.g., from a microphone) may be used by the apparatus 102 to detect when a door of the refrigerator 138 is opened and/or closed. In some embodiments, the fourth sensing device 140 and/or other sensing devices associated with the refrigerator 138 may be add-on devices that may be used with an existing refrigerator that may already be deployed in a commercial or home setting. In various embodiments, the apparatus 102 may be located in a cloud computing or server environment. In some embodiments, sensor data from the fourth sensing device 140 may be correlated at an edge of the system such as at a gateway before being sent to a cloud computing environment that includes the apparatus 102. In some embodiments, the apparatus 102 may be configured to recognize appliance states and/or provide recommendations relating to appliances located in multiple remote locations. In various embodiments, the apparatus 102 may record and/or send appliance state and/or recommendation information to one or more designated people monitoring use of the appliances instead of, or in addition to, a user of the appliances. For example, the apparatus 102 may provide appliance monitoring information and/or recommendations to a designated person from a fleet operator or brand that wishes to monitor multiple deployed refrigerators, freezers, and/or beverage coolers that may be in multiple locations.

Some home appliances such as clothes washing machines, clothes dryers, and dishwashers have existed in the marketplace and provided users with conveniences for decades. However, these appliances require user interaction such as filling the washer with laundry, selecting the correct setting, and starting the machine. In various cases, the user may need to interact with the machine again when the cycle is finished to transfer the load of laundry to the dryer. Similarly, with clothes dryers and dishwashers, the user needs to interact with the machine at the beginning of its cycle of operation and when it is finished. Users will often forget about these interactions, such as when a user forgets to empty the washer and transfer the laundry to the dryer. This may result in inefficient laundry flow and in some cases moldy clothes that may require further intervention. Issues with user interaction may also arise when multiple users are interacting with or could potentially interact with the same appliance such as when multiple family members use a dishwasher. In some situations, one of the users, not knowing that the dishes in the dishwasher are clean, may insert a dirty dish on the top rack that drips onto other items on the bottom rack, requiring the load to be run again. Some users may also not follow the best procedures for running times and other interactions with an appliance such as scheduling run times to minimize the annoyance of its loud operation. In various embodiments, the apparatus 102 may assist users in addressing one or more of these issues.

In some embodiments, the appliance state recognition module 122, the response module 124, and/or other modules or components may use an algorithm that may adapt to particular appliances. In various embodiments, one or more modules or components of the apparatus 102 may use crowd-sourced information in making a determination, generating a response, or modeling behavior. In some embodiments, characteristics of an appliance make and model, that may be based at least in part on the appliance model, year of purchase, installment parameters, frequency of usage or, amount of operation hours may be transferred from one apparatus or system location to another that has a similar appliance in order to bootstrap a learning module that may be included in the other components 132 of the apparatus 102.

In various embodiments, the apparatus 102 may determine an optimal point of running an appliance in order to optimize finish time or any other stage of operation that needs user intervention. As an example, if a user loads their washing machine at 10 p.m. and pushes the start button, they may typically not have time to unload it until they wake up in the morning (e.g., based on typical cycle time and previous user behavior), so the apparatus 102 may delay the start time until 5 a.m. (e.g., by sending a delayed start command to an appliance controller), giving ample time for the cycle to finish before the user is awake and can transfer the load to the dryer. By doing so, the apparatus 102 may mitigate the problem of wet clothes sitting in the washing machine for too long. In some embodiments, the apparatus 102 may also factor in energy costs that vary throughout the day. In various embodiments, the apparatus 102 may determine the best time to run a laundry cycle based at least in part on when the cycle will complete as compared to when the user is likely to check the laundry for a next step. In some embodiments, the apparatus 102 may take advantage of a drop in energy cost in between those two times (e.g., overnight). Based at least in part on user preferences, the apparatus 102 may perform similar determinations with respect to the clothes dryer. The apparatus 102 may delay a start time for the dryer to reduce the wrinkle effect from dry clothes sitting in the dryer for too long before removal by a user.

In some embodiments, other sensors such as motion or proximity sensors (e.g., proximity sensors 116, 118) may be used by the apparatus 102 to learn the behavior of different household members. In various embodiments, this feature may be used by the apparatus 102 to assign interventions to different household members who may not know otherwise, unless told explicitly, that the dishwasher needs to be emptied or a laundry load needs to be transferred. For example, a teenage child may be asked to transfer a laundry load to a dryer, a task that they do not usually perform, in response to the apparatus 102 detecting that the child is home before soccer practice and can accomplish the task.

Figure 2:
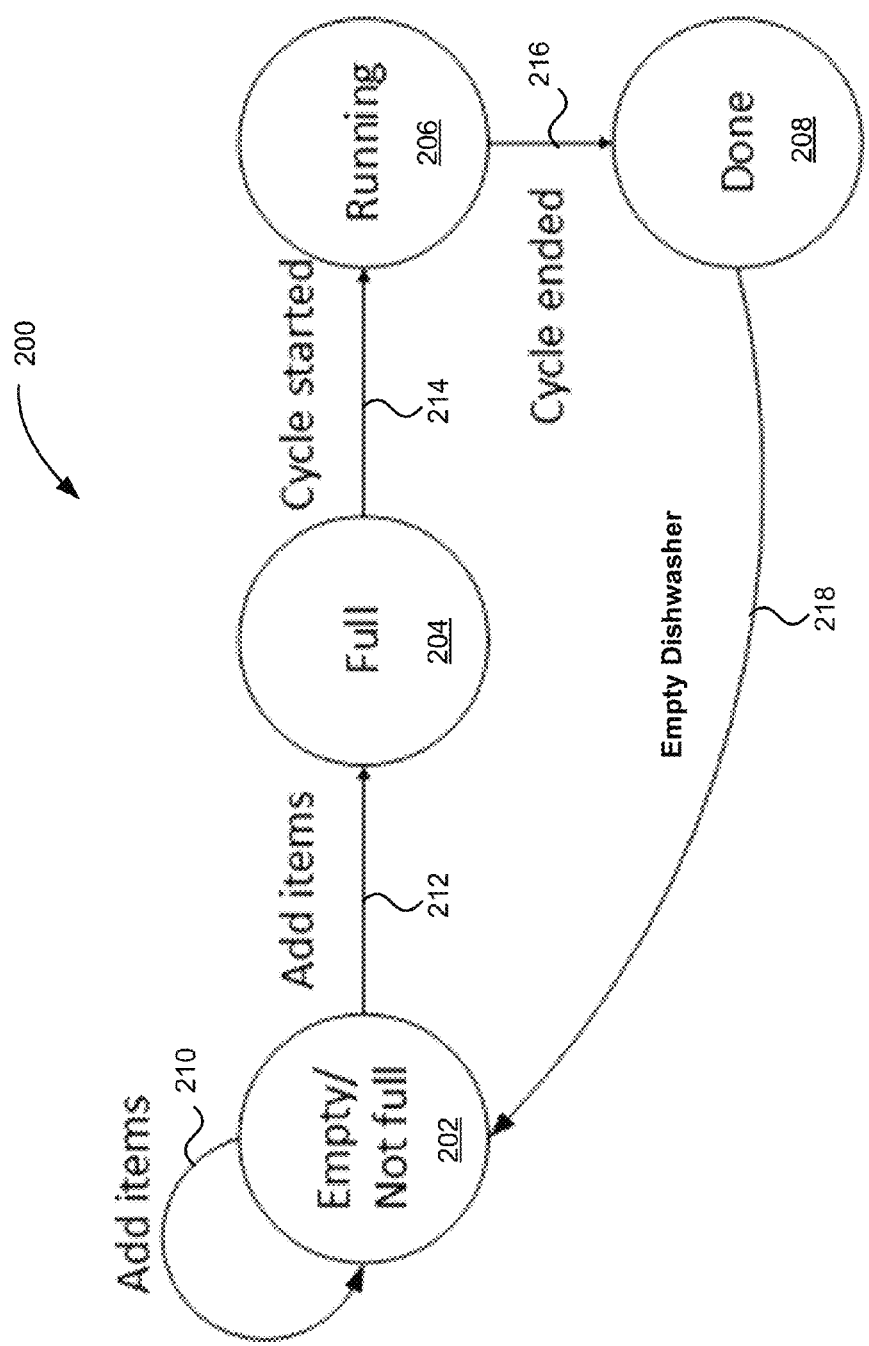
FIG. 2 is an appliance state diagram, according to various embodiments.

FIG. 2 is an appliance state diagram 200, according to various embodiments. The appliance state diagram 200 shows a plurality of dishwasher states and transition events between states that may correspond to the states of the dishwasher 104 of FIG. 1 in various embodiments. In some embodiments, the state diagram 200 may include an empty/not full state 202, a full state 204, a running state 206, and a done state 208. In some embodiments, items to be washed (e.g., dishes, silverware) may be added to the dishwasher 104 while it is being filled at a first add items event 210 that may both start and terminate at the empty/not full state 202. In various embodiments, a second add items event 212 may start at the empty/not full state 202 and terminate at the full state 204. It should be understood that in various embodiments, the first add items event 210 may occur multiple times before the second add items event 212 occurs during filling of the dishwasher 104, and that in some cases the first add items event 210 may not occur, such as when the dishwasher 104 may be completely filled during a single filling event after it has been emptied. A cycle started event 214 may begin at the full state 204 and end at the running state 206. In some embodiments, a cycle ended event 216 may begin at the running state 206 and end at the done state 208. In various embodiments, an empty dishwasher event 218 may begin at the done state 208 and end at the empty/not full state 202.

In some embodiments, the appliance state recognition module 122 may determine the dishwasher states by keeping track of a current dishwasher state and determining whether transition events have occurred, resulting in transition to a next dishwasher state which becomes the current dishwasher state after the state transition. In some embodiments, the appliance state recognition module 122 may use a probabilistic model in determining a current state and/or whether transition events have occurred. In various embodiments, the appliance state recognition module 122 may determine cycle started and/or cycle ended states based at least in part on temperature data from one or more temperature sensors such as described below with respect to FIG. 3. In some embodiments, the appliance state recognition module 122 may detect a transition from the done state 208 to the empty/not full state 202 based at least in part on data from a movement sensor such as an accelerometer.

In various embodiments, the appliance state recognition module 122 may detect a door opening motion based at least in part on accelerometer data. In some embodiments, the appliance state recognition module 122 may determine a duration of time the door was open to estimate whether the door was open enough during one session, or cumulatively over multiple sessions, for the dishwasher 104 to have transitioned from an empty state to a full state while in the empty/not full state 202. In various embodiments, the appliance state recognition module 122 may also determine whether one or more racks of the dishwasher 104 have been rolled out of the dishwasher 104 based at least in part on the accelerometer data.

In similar fashion to that described with respect to the dishwasher states and transition events, the appliance state recognition module 122 may detect events and/or determine states for the clothes washer 106, the clothes dryer 108, and/or other appliances in various embodiments. In some embodiments, the appliance state recognition module 122 may extract a set of features based at least in part on temperature and/or motion data from the sensors. In various embodiments, while the machines are running, vibration from the door and temperature may be detected and used to determine the beginning of a cycle by the appliance state recognition module 122. For some cycles, such as a gentle cycle on the clothes washer 106, movement may stop for an extended duration during the cycle. In various embodiments, the appliance state recognition module 122 may continue to detect the cycle by initially detecting the door was open and closed, detecting vibration from the initial phase (water filling and some movement). At this point in time, a confidence level of cycle detection may be high, and the appliance state recognition module 122 may age the confidence level as time goes by. As the cycle periodically moves the clothes, the appliance state recognition module 122 may reinforce detection and confidence level of the cycle state.

Figure 3:
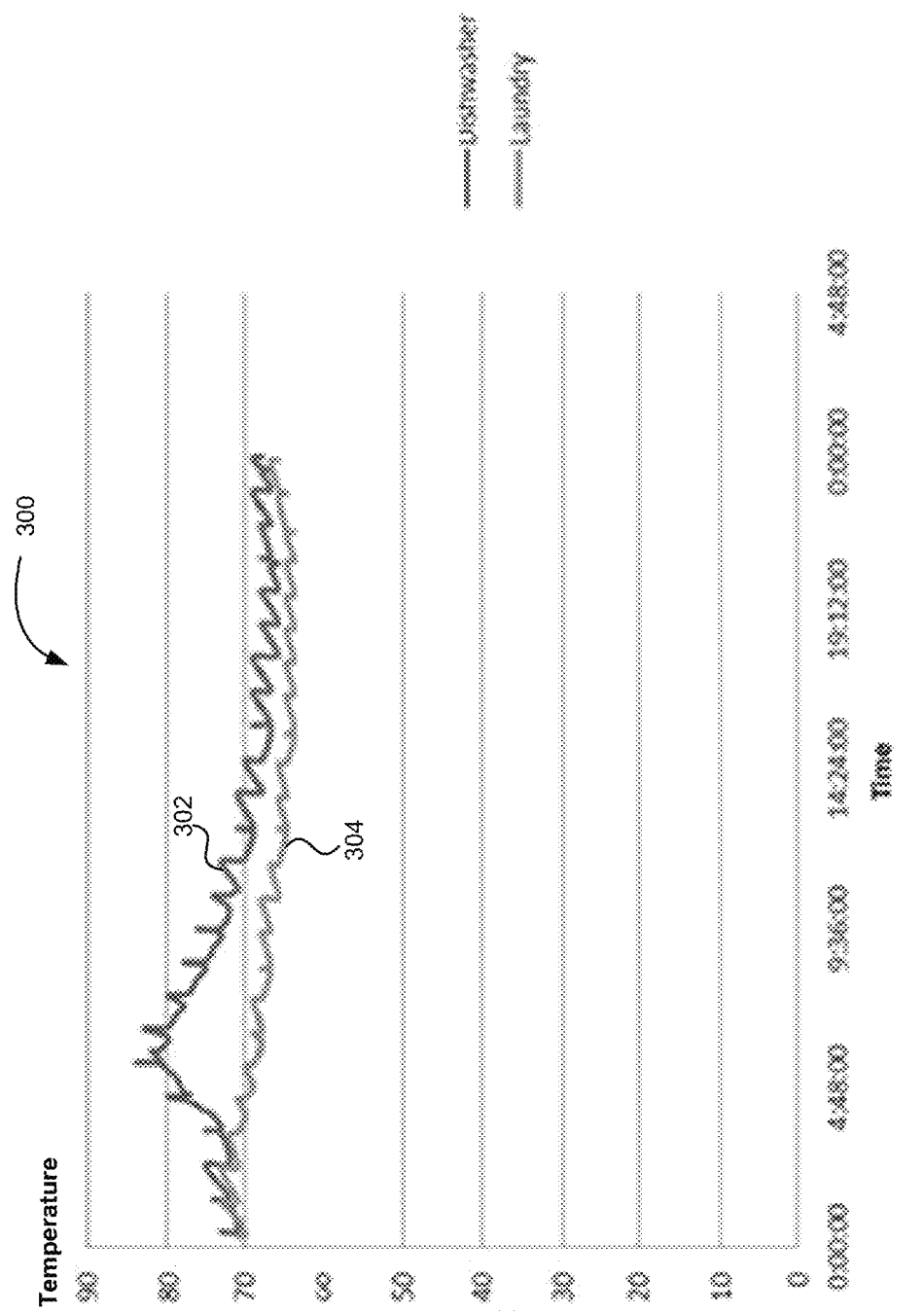
FIG. 3 is a diagram showing a comparison of temperature data used to recognize an appliance state, according to various embodiments.

FIG. 3 is a sensor data diagram 300 showing a comparison of temperature data that may be used to recognize an appliance state, according to various embodiments. A first temperature data series 302 from a first temperature sensor (e.g., temperature sensor of sensing device 110) and a second temperature data series 304 from a second temperature sensor (e.g., temperature sensor of sensing device 112) may be used by the appliance state recognition module 122 in some embodiments. In various embodiments, the first temperature data series 302 may represent temperature data from a temperature sensor associated with a dishwasher and the second temperature data series 304 may represent temperature data from a second temperature sensor that may be associated with a laundry appliance (e.g., a clothes washer or a clothes dryer), a laundry room, or a temperature sensor in some other location in various embodiments.

In some embodiments, the appliance state recognition module 122 may be to determine whether a cycle has started and/or a cycle has ended based at least in part on comparing the first temperature as measured by the first temperature sensor to the temperature measured on the second temperature sensor. In various embodiments, the appliance state recognition module may use a thresholding event detection mechanism on the temperature stream of the first and second temperature data to detect the beginning and end of a dishwasher cycle. In some embodiments, a first predetermined threshold difference may be used by the appliance state recognition module 122 to determine a cycle has started when the first temperature exceeds the second temperature by at least the first predetermined threshold difference. In various embodiments, a second predetermined threshold difference may be used by the appliance state recognition module 122 to determine a cycle has ended when the first temperature exceeds the second temperature by less than the second predetermined threshold difference after a cycle has started. In some embodiments, temperature spikes in the data from the first and/or second temperature sensors may be filtered such as by using a moving average of the temperature data.

Figure 4:
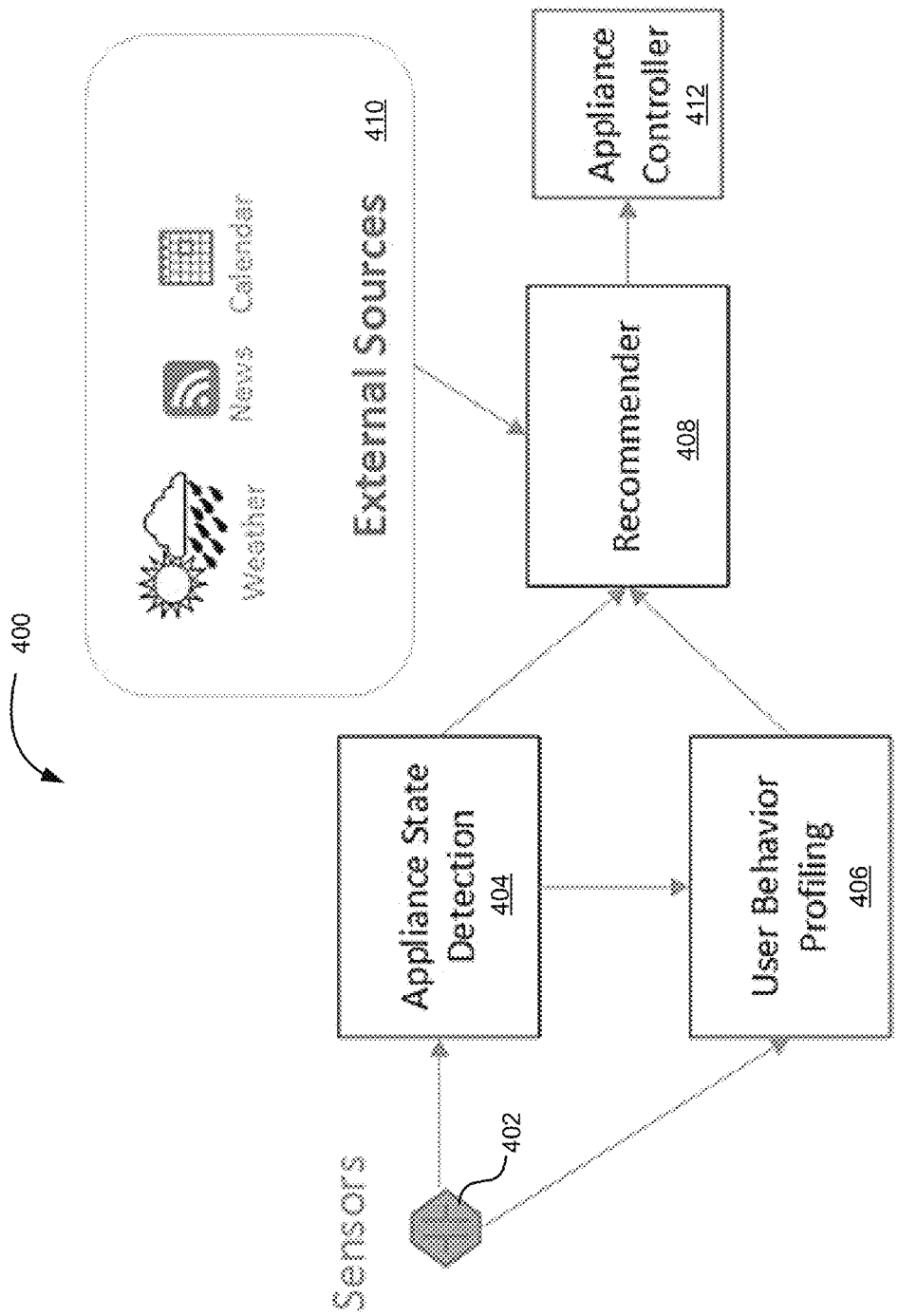
FIG. 4 is a block diagram of a system that may include one or more components of the appliance state recognition apparatus of FIG. 1, according to various embodiments.

FIG. 4 is a block diagram of a system 400 that may include one or more components of the appliance state recognition apparatus 102 described with respect to FIG. 1, according to various embodiments. In some embodiments, the system 400 may include one or more sensors 402 (e.g., one or more of temperature, accelerometer, or contact sensors of sensing device 110, 112, 114 and/or proximity sensors 116, 118) that may provide sensor data to one or more of an appliance state detection subsystem 404 and/or a user behavior profiling subsystem 406. In various embodiments, the appliance state detection subsystem 404 may include the appliance state recognition module 122 described with respect to FIG. 1 or similar functionality. In some embodiments, the behavior profiling subsystem 406 may include the behavior modeling module 134 described with respect to FIG. 1 or similar functionality.

In various embodiments, a recommender subsystem 408 may be coupled with and/or receive data from the appliance state detection subsystem 404 and the user behavior profiling subsystem 406. In some embodiments, the recommender subsystem 408 may include the response module 124 and/or the transmission module 126 described with respect to FIG. 1 or similar functionality. The recommender subsystem 408 may also be coupled with and/or receive data from one or more external sources 410 such as a weather information source, a news source, or a calendar of a user in some embodiments. In various embodiments, the recommender subsystem 408 may direct an appliance controller 412 based at least in part on one or more communications from the appliance state detection subsystem 404, the user behavior profiling subsystem 406, and/or the external sources 410. In some embodiments, the recommender subsystem 408 may generate a recommendation to be presented on a presentation device (e.g., mobile device 130 or other presentation device 132) in addition to, or instead of, directing appliance controller 412.

In various embodiments, one or more subsystems or components of the system 400 may acquire data from the sensors 402, detect one or more appliance states, and use that information with a user's profile and current presence information to determine the best time and series of events for running the one or more appliances. In some embodiments, the appliance controller 412 may provide for control of a start time of an appliance with which it is associated. In embodiments where an appliance does not support such a control mechanism, information may be sent to a user by the recommender subsystem 408 with respect to one or more recommended actions and their timelines. In various embodiments, the recommender subsystem 408 may consider other events in generating a recommendation such as weather, news, and personal or family calendars when access to such data is provided. In some embodiments, the recommender subsystem 408 may use correlations of appliance activity with these external factors to better model user behavior and offer more personalized assistance for a household.

Figure 5:
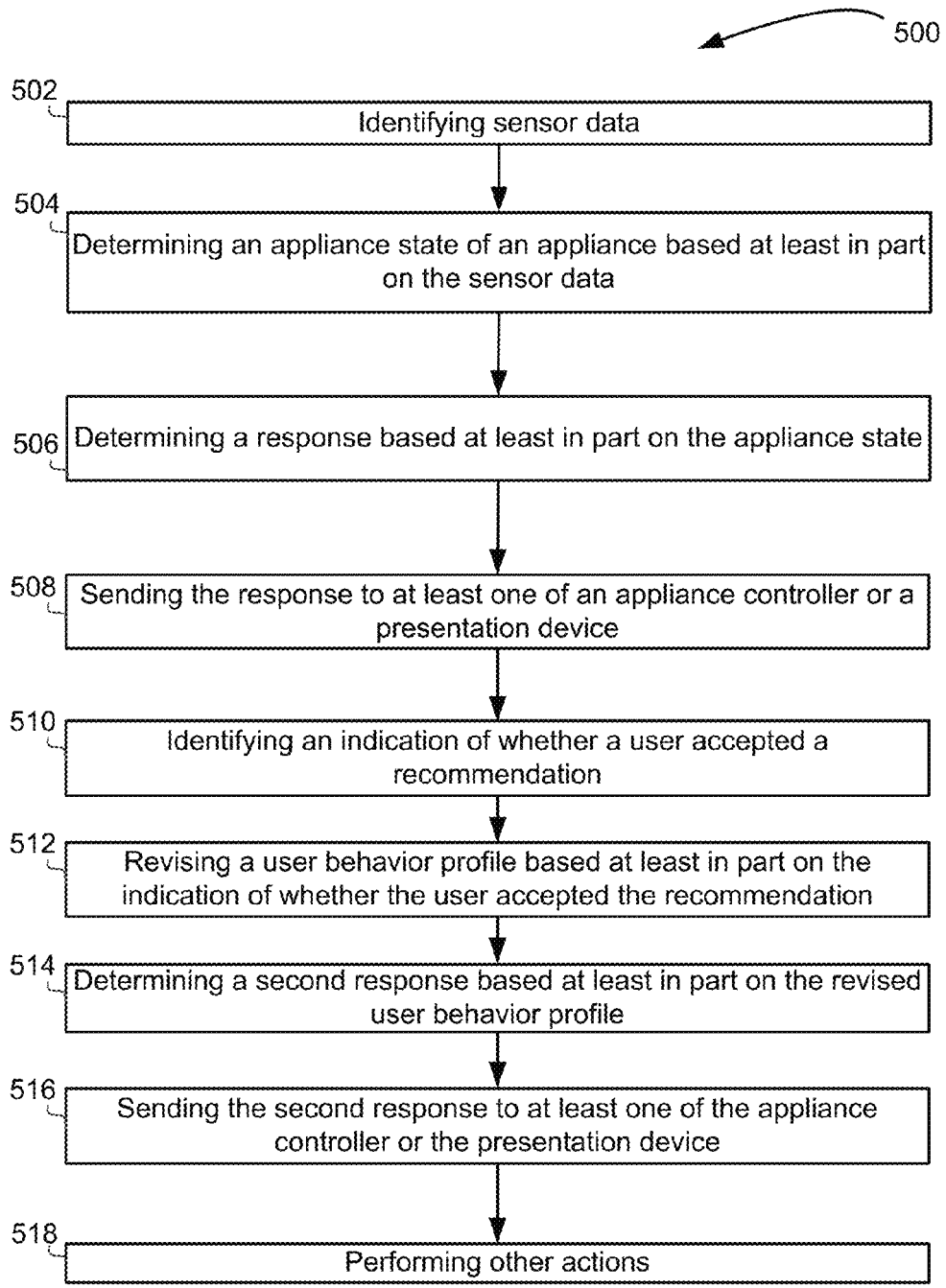
FIG. 5 is a flow diagram illustrating a method of recognizing an appliance state and determining a response, according to various embodiments.

FIG. 5 is a flow diagram illustrating a method 500 of recognizing an appliance state and determining a response, according to various embodiments. In embodiments, some or all of the method 500 may be practiced by components shown in the operating environment 100 and/or the system 400, that may include components of the apparatus 102, described with respect to FIG. 1 and/or subsystems or other components of the system 400 described with respect to FIG. 4.

In some embodiments, the method 500 may include identifying sensor data in one or more signals relating to data from one or more sensors associated with an appliance (e.g., dishwasher, clothes washer, clothes dryer) at a block 502. In some embodiments, the sensor data may include one or more of motion data or temperature data (e.g., from a temperature sensor or accelerometer of sensing device 110, 112, or 114). In some embodiments, the sensor data module 120 may identify the sensor data. In various embodiments, the method 500 may include determining an appliance state of the appliance based at least in part on the sensor data at a block 504 (e.g., with appliance state recognition module 122 or appliance state detection subsystem 404). In some embodiments, at a block 506, the method 500 may include determining a response based at least in part on the appliance state (e.g., with response module 124 or recommender subsystem 408). Determining the response may include determining a delayed start time based at least in part on a time of day in some embodiments. In various embodiments, the method 500 may include sending the response to at least one of an appliance controller (e.g., appliance controller 128) for the appliance or a presentation device (e.g., mobile device 130 and/or other presentation device 132) at a block 508. In some embodiments, the transmission module 126 may send the response.

In some embodiments sending the response may include sending a recommendation to the presentation device and the method 500 may further include, at a block 510, identifying an indication of whether a user accepted the recommendation. In various embodiments, at a block 512, the method 500 may further include revising a user behavior profile based at least in part on the indication. In some embodiments, the behavior modeling module 134 may identify the indication of whether the user accepted the recommendation and/or may revise the user behavior profile. In some embodiments, the response may be a first response and the method 500 may further include, at a block 514, determining a second response (e.g., with response module 124) based at least in part on the revised user behavior profile. In various embodiments, the method 500 may include sending the second response to at least one of the appliance controller or the presentation device at a block 516. In some embodiments, one or more of the first and/or second responses may be a recommendation for a user action. In various embodiments, the method 500 may include performing other actions at a block 518.

Figure 6:
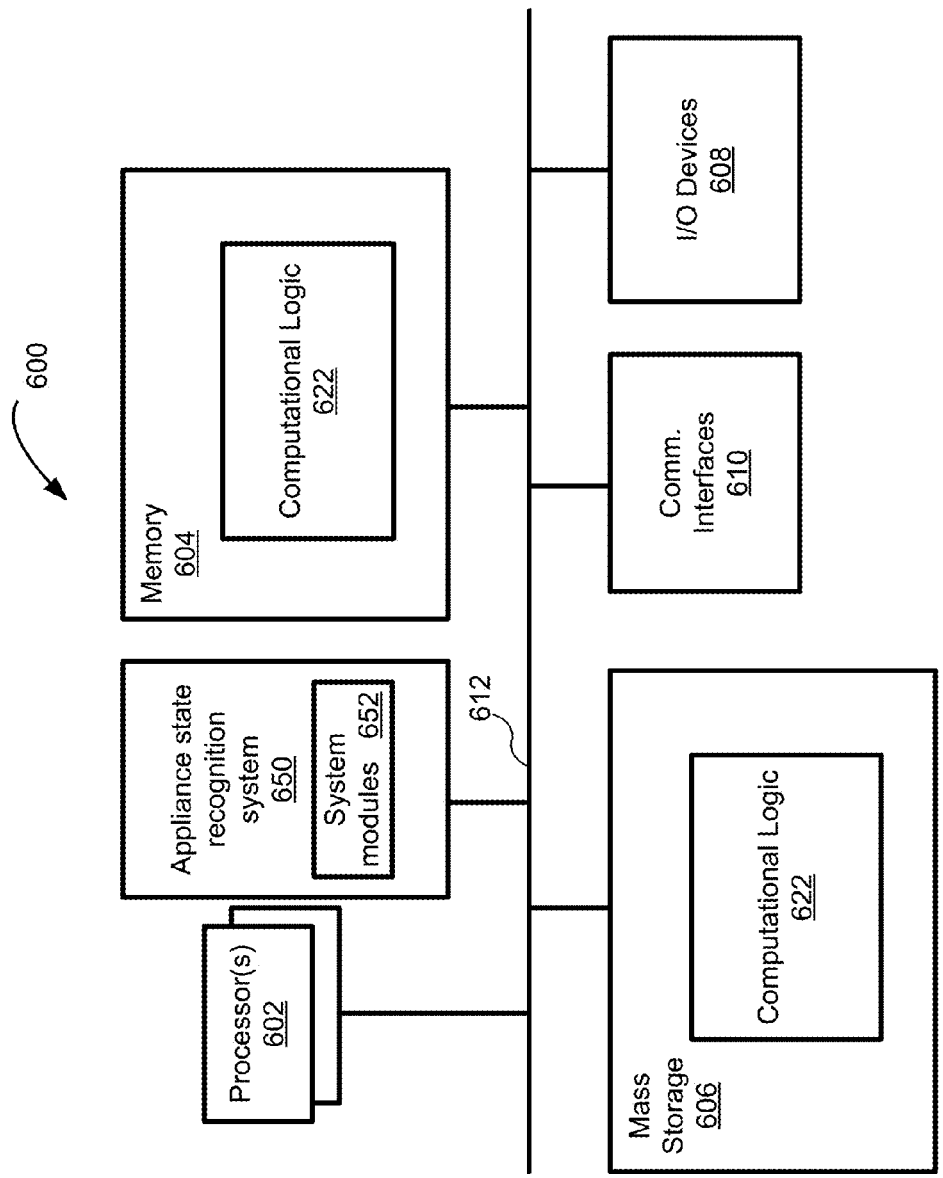
FIG. 6 schematically illustrates an example computer device to recognize an appliance state, according to various embodiments.

FIG. 6 illustrates an example computer device 600 that may include components corresponding to and/or implementing various components and methods of FIGS. 1-5, such as appliance state recognition apparatus 102 with sensor data module 120, appliance state recognition module 122, response module 124, transmission module 126, and behavior modeling module 134, described with respect to FIG. 1, and/or subsystems or other components of system 400 described with respect to FIG. 4 in accordance with various embodiments. As shown, computer device 600 may include one or more processors 602, each having one or more processor cores, and system memory 604. The processor 602 may include any type of processors, single or multi-core microprocessors, and the like. The processor 602 may be implemented as an integrated circuit. The computer device 600 may include mass storage devices 606 (such as diskette, hard drive, volatile memory (e.g., dynamic random-access memory (DRAM), compact disc read-only memory (CD-ROM), digital versatile disk (DVD), and so forth). In general, system memory 604 and/or mass storage devices 606 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computer device 600 may further include input/output devices 608 (such as a display (e.g., a touchscreen display), keyboard, cursor control, remote control, gaming controller, image capture device, and so forth) and communication interfaces 610 (such as network interface cards, modems, infrared receivers, radio receivers (e.g., Bluetooth), and so forth). The computer device 600 may include an appliance state recognition system 650 having appliance state recognition, recommendation, and/or control capabilities that may include system modules 652. In various embodiments, the appliance state recognition system 650 may be configured similarly to the apparatus 102 or the system 400. In some embodiments, the system modules 652 may include or be configured similarly to one or more of sensor data module 120, appliance state recognition module 122, response module 124, transmission module 126, behavior modeling module 128, and/or other components 138.

The communication interfaces 610 may include communication chips (not shown) that may be configured to operate the computer device 600 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 610 may operate in accordance with other wireless protocols in other embodiments.

The above-described computer device 600 elements may be coupled to each other via system bus 612, which may represent one or more buses. In the case of multiple buses, they may be bridged by one or more bus bridges (not shown). Each of these elements may perform its conventional functions known in the art. In particular, system memory 604 and mass storage devices 606 may be employed to store a working copy and a permanent copy of the programming instructions, such as drivers, for the operation of various components of computer device 600, including but not limited to operation of the apparatus 102 of FIG. 1, the system 400 of FIG. 4, the sensor data module 120, appliance state recognition module 122, response module 124, transmission module 126, behavior modeling module 128, and/or other components 138 of FIG. 1, an operating system of computer device 600, and/or one or more applications, collectively referred to as computational logic 622. The various elements may be implemented by assembler instructions supported by processor(s) 602 or high-level languages that may be compiled into such instructions.

The permanent copy of the programming instructions may be placed into mass storage devices 606 in the factory or in the field through, for example, a distribution medium (not shown), such as a compact disc (CD), or through communication interface 610 (from a distribution server (not shown)). That is, one or more distribution media having an implementation of the agent program may be employed to distribute the agent and to program various computing devices.

The number, capability, and/or capacity of the elements 608, 610, 612 may vary, depending on whether computer device 600 is used as a stationary computing device, such as a set-top box or desktop computer, or a mobile computing device, such as a tablet computing device, laptop computer, game console, or smartphone. Their constitutions are otherwise known, and accordingly will not be further described.

For some embodiments, at least one of processors 602 may be packaged together with all or portions of computational logic 622 configured to facilitate aspects of embodiments described herein to form a System in Package (SiP) or a System on Chip (SoC).

The computer device 600 may include or otherwise be associated with an appliance state recognition system or apparatus that may include components and/or implement methods described with respect to FIGS. 1-5, such as the apparatus 102, the system 400, the method 500, the appliance state recognition module 122, the response module 124, and/or other modules as described above. In some embodiments, one or more components such as processor 602 may be included as a part of the apparatus 102.

In various implementations, the computer device 600 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computer device 600 may be any other electronic device that processes data.

Figure 7:
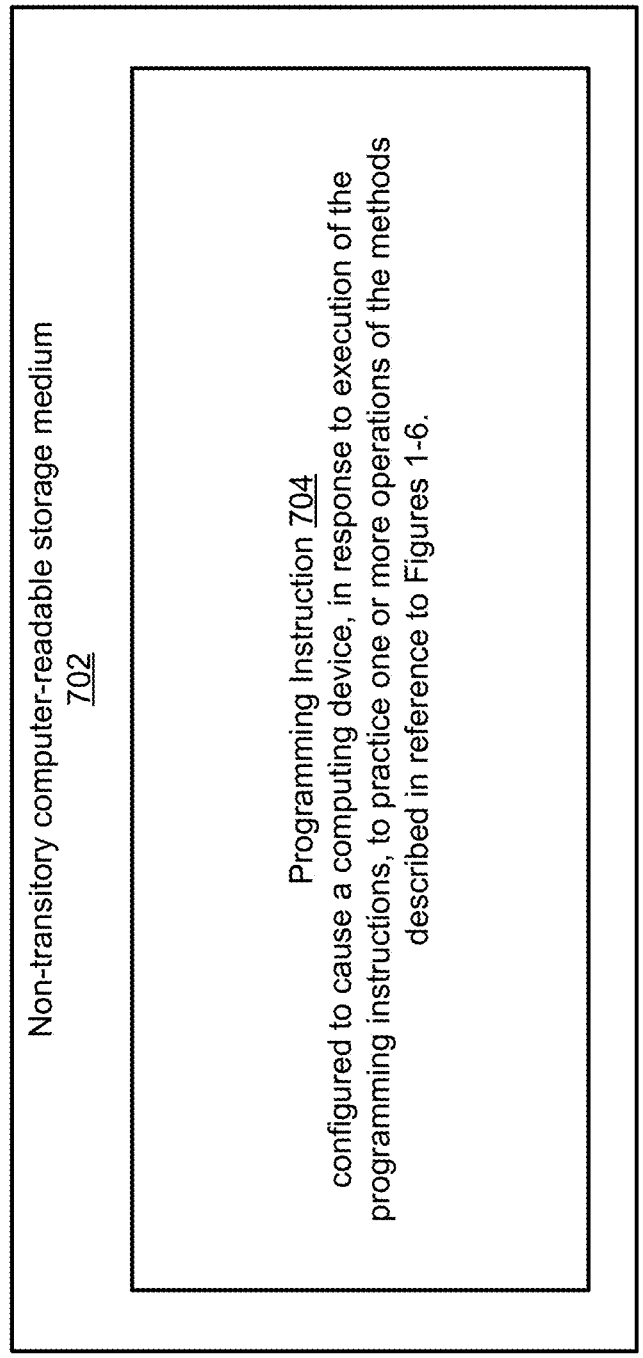
FIG. 7 illustrates an example storage medium with instructions configured to enable an apparatus to practice various aspects of the present disclosure, in accordance with various embodiments.

FIG. 7 illustrates example computer-readable storage medium 702 having instructions configured to practice all or selected ones of the operations associated with the computer device 600, earlier described with respect to FIG. 6; the apparatus 102 of FIG. 1; subsystems or other components of the system 400 of FIG. 4; the sensor data module 120; appliance state recognition module 122; response module 124; transmission module 126; behavior modeling module 128; and/or other components 138 of FIG. 1, in accordance with various embodiments. As illustrated, computer-readable storage medium 702 may include a number of programming instructions 704. The storage medium 702 may represent a broad range of non-transitory persistent storage medium known in the art, including but not limited to flash memory, dynamic random access memory, static random access memory, an optical disk, a magnetic disk, etc. Programming instructions 704 may be configured to enable a device, e.g., computer 600; apparatus 102 of FIG. 1; subsystems or other components of the system 400 of FIG. 4; the sensor data module 120; appliance state recognition module 122; response module 124; transmission module 126; behavior modeling module 128; and/or other components 138 of FIG. 1, in response to execution of the programming instructions 704, to perform, e.g., but not limited to, various operations described for the sensor data module 120, appliance state recognition module 122, response module 124, transmission module 126, behavior modeling module 128, and/or other components 138 of FIG. 1, or operations shown in process 500 of FIG. 5. In alternate embodiments, programming instructions 704 may be disposed on multiple computer-readable storage media 702. In alternate embodiment, storage medium 702 may be transitory, e.g., signals encoded with programming instructions 704.

Referring back to FIG. 6, for an embodiment, at least one of processors 602 may be packaged together with memory having all or portions of computational logic 622 configured to practice aspects described for the sensor data module 120, appliance state recognition module 122, response module 124, transmission module 126, behavior modeling module 128, and/or other components 138 of FIG. 1, subsystems or other components of system 400 of FIG. 4, or operations shown in process 500 of FIG. 5. For an embodiment, at least one of processors 602 may be packaged together with memory having all or portions of computational logic 622 configured to practice aspects described for the sensor data module 120, appliance state recognition module 122, response module 124, transmission module 126, behavior modeling module 128, and/or other components 138 of FIG. 1, subsystems or other components of system 400 of FIG. 4, or operations shown in process 500 of FIG. 5 to form a System in Package (SiP). For an embodiment, at least one of processors 602 may be integrated on the same die with memory having all or portions of computational logic 622 configured to practice aspects described for the sensor data module 120, appliance state recognition module 122, response module 124, transmission module 126, behavior modeling module 128, and/or other components 138 of FIG. 1, subsystems or other components of system 400 of FIG. 4, or operations shown in process 500 of FIG. 5. For an embodiment, at least one of processors 602 may be packaged together with memory having all or portions of computational logic 622 configured to practice aspects of the sensor data module 120, appliance state recognition module 122, response module 124, transmission module 126, behavior modeling module 128, and/or other components 138 of FIG. 1, subsystems or other components of system 400 of FIG. 4, or operations shown in process 500 of FIG. 5 to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an apparatus to recognize an appliance state comprising: a sensor data identifier, to identify sensor data in one or more signals relating to data from one or more sensors associated with an appliance; an appliance state detector, to determine an appliance state of the appliance based at least in part on the sensor data; a responder, to determine a response, based at least in part on the appliance state; and a transmitter, to send the response to at least one of an appliance controller for the appliance or a presentation device.

Example 2 may include the subject matter of Example 1, further comprising one or more processors, wherein the sensor data identifier, the appliance state detector, and the responder are to be operated on the one or more processors.

Example 3 may include the subject matter of any one of Examples 1-2, wherein the appliance is a dishwasher, a clothes washer, or a clothes dryer.

Example 4 may include the subject matter of any one of Examples 1-3, wherein the appliance is a dishwasher, the sensor data includes accelerometer data and temperature data, and the appliance state detector is to determine the dishwasher appliance state from a set of appliance states that includes not full, full, running, and done.

Example 5 may include the subject matter of any one of Examples 1-4, wherein the response is a recommendation for a user action and the transmitter is to send the response to the presentation device.

Example 6 may include the subject matter of any one of Examples 1-5, wherein the appliance state detector is to determine the appliance state based at least in part on a probabilistic model.

Example 7 may include the subject matter of any one of Examples 1-6, further including a behavior modeler, to determine a user behavior profile based at least in part on usage of the appliance, wherein the responder is to determine the response also based at least in part on the user behavior profile.

Example 8 may include the subject matter of any one of Examples 1-7, wherein the sensor data includes proximity data from a first sensor and one or more of accelerometer or temperature data from one or more additional sensors, wherein the appliance state detector is to determine the appliance state based at least in part on one or more of the accelerometer or temperature data, and wherein the responder is to determine the response based at least in part on the proximity data and the appliance state.

Example 9 may include the subject matter of any one of Examples 1-8, wherein the sensor data includes first temperature data from a first temperature sensor and second temperature data from a second temperature sensor, and wherein the appliance state detector is to determine the appliance state based at least in part on the first temperature data and the second temperature data.

Example 10 may include the subject matter of any one of Examples 1-9, wherein the appliance state detector is also to detect a door opening motion and determine an open door time duration based at least in part on the sensor data, wherein the appliance state detector is to determine the appliance state based at least in part on the open door time duration.

Example 11 may include a method for recognition of an appliance state comprising: identifying sensor data in one or more signals relating to data from one or more sensors associated with an appliance; determining an appliance state of the appliance based at least in part on the sensor data; determining a response based at least in part on the appliance state; and sending the response to at least one of an appliance controller for the appliance or a presentation device.

Example 12 may include the subject matter of Example 11, wherein identifying comprises identifying sensor data that includes one or more of motion data or temperature data.

Example 13 may include the subject matter of any one of Examples 11-12, wherein identifying comprises identifying sensor data of an appliance that is a dishwasher, a clothes washer, or a clothes dryer.

Example 14 may include the subject matter of any one of Examples 11-13, wherein determining the response includes determining a delayed start time based at least in part on a time of day.

Example 15 may include the subject matter of any one of Examples 11-14, wherein sending the response includes sending a recommendation to the presentation device, wherein the method further includes: identifying an indication of whether a user accepted the recommendation; and revising a user behavior profile based at least in part on the indication.

Example 16 may include the subject matter of Example 15, wherein the response is a first response and the method further includes: determining a second response based at least in part on the revised user behavior profile; and sending the second response to at least one of the appliance controller or the presentation device.

Example 17 may include the subject matter of any one of Examples 11-16, wherein the response is a recommendation for a user action and sending the response includes sending the response to a presentation device.

Example 18. One or more computer-readable media comprising instructions that cause a computing device, in response to execution of the instructions by the computing device, to: identify sensor data in one or more signals relating to data from one or more sensors associated with an appliance; determine an appliance state of the appliance based at least in part on the sensor data; determine a response based at least in part on the appliance state; and send the response to at least one of an appliance controller for the appliance or a presentation device.

Example 19 may include the subject matter of Example 18, wherein the sensor data includes one or more of motion data or temperature data.

Example 20 may include the subject matter of any one of Examples 18-19, wherein the appliance is a dishwasher, a clothes washer, or a clothes dryer.

Example 21 may include the subject matter of any one of Examples 18-20, wherein the instructions are also to cause the computing device to determine a delayed start time based at least in part on a time of day.

Example 22 may include the subject matter of any one of Examples 18-21, wherein the response is a recommendation for a user action and the instructions are to cause the computing device to send the recommendation to the presentation device.

Example 23 may include the subject matter of any one of Examples 18-22, wherein the presentation device is a visual presentation device.

Example 24 may include the subject matter of any one of Examples 18-22, wherein the presentation device is an audio presentation device.

Example 25 may include the subject matter of any one of Examples 22-24, wherein the instructions are also to cause the computing device to: identify an indication of whether a user accepted the recommendation; and revise a user behavior profile based at least in part on the indication.

Example 26. An apparatus to recognize an appliance state comprising: means for identifying sensor data in one or more signals relating to data from one or more sensors associated with an appliance; means for determining an appliance state of the appliance based at least in part on the sensor data; means for determining a response, based at least in part on the appliance state; and means for sending the response to at least one of an appliance controller for the appliance or a presentation device.

Example 27 may include the subject matter of Example 26, further comprising means for processing data, wherein the means for identifying sensor data, the means for determining an appliance state of the appliance, and the means for determining the response are to be operated on the means for processing data.

Example 28 may include the subject matter of any one of Examples 26-27, wherein the appliance is a dishwasher, a clothes washer, or a clothes dryer.

Example 29 may include the subject matter of any one of Examples 26-28, wherein the appliance is a dishwasher, the sensor data includes accelerometer data and temperature data, and the means for determining an appliance state of the appliance is to determine the dishwasher appliance state from a set of appliance states that includes not full, full, running, and done.

Example 30 may include the subject matter of any one of Examples 26-29, wherein the response is a recommendation for a user action and the means for sending the response is to send the response to the presentation device.

Example 31 may include the subject matter of any one of Examples 26-30, wherein the means for determining an appliance state of the appliance is to determine the appliance state based at least in part on a probabilistic model.

Example 32 may include the subject matter of any one of Examples 26-31, further including means for determining a user behavior profile based at least in part on usage of the appliance, wherein the means for determining a response is to determine the response also based at least in part on the user behavior profile.

Example 33 may include the subject matter of any one of Examples 26-32, wherein the sensor data includes proximity data from a first sensor and one or more of accelerometer or temperature data from one or more additional sensors, wherein the mans for determining an appliance state of the appliance is to determine the appliance state based at least in part on one or more of the accelerometer or temperature data, and wherein the means for determining a response is to determine the response based at least in part on the proximity data and the appliance state.

Example 34 may include the subject matter of any one of Examples 26-33, wherein the sensor data includes first temperature data from a first temperature sensor and second temperature data from a second temperature sensor, and wherein the means for determining an appliance state of the appliance is to determine the appliance state based at least in part on the first temperature data and the second temperature data.

Example 35 may include the subject matter of any one of Examples 26-34, wherein the means for determining an appliance state of the appliance is also to detect a door opening motion and determine an open door time duration based at least in part on the sensor data, wherein the means for determining an appliance state of the appliance is to determine the appliance state based at least in part on the open door time duration.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus to recognize an appliance state comprising:
    a sensor data identifier, to identify sensor data in one or more signals relating to data from one or more sensors associated with an appliance;
    an appliance state detector, to determine an appliance state of the appliance based at least in part on the sensor data;
    a responder, to determine a response, based at least in part on the appliance state; and
    a transmitter, to send the response to at least one of an appliance controller for the appliance or a presentation device, wherein the appliance is a dishwasher and the appliance state detector is to determine the dishwasher appliance state from a set of appliance states that includes not full, full, running, and done.

2. The apparatus of claim 1, further comprising one or more processors, wherein the sensor data identifier, the appliance state detector, and the responder are to be operated on the one or more processors.

3. The apparatus of claim 1, wherein the sensor data includes accelerometer data and temperature data.

4. The apparatus of claim 1, wherein the response is a recommendation for a user action and the transmitter is to send the response to the presentation device.

5. The apparatus of claim 1, wherein the appliance state detector is to determine the appliance state based at least in part on a probabilistic model.

6. The apparatus of claim 1, further including a behavior modeler, to determine a user behavior profile based at least in part on usage of the appliance, wherein the responder is to determine the response also based at least in part on the user behavior profile.

7. The apparatus of claim 1, wherein the sensor data includes proximity data from a first sensor and one or more of accelerometer or temperature data from one or more additional sensors, wherein the appliance state detector is to determine the appliance state based at least in part on one or more of the accelerometer or temperature data, and wherein the responder is to determine the response based at least in part on the proximity data and the appliance state.

8. The apparatus of claim 1, wherein the sensor data includes first temperature data from a first temperature sensor and second temperature data from a second temperature sensor, and wherein the appliance state detector is to determine the appliance state based at least in part on the first temperature data and the second temperature data.

9. The apparatus of claim 1, wherein the appliance state detector is also to detect a door opening motion and determine an open door time duration based at least in part on the sensor data, wherein the appliance state detector is to determine the appliance state based at least in part on the open door time duration.

10. A method for recognition of an appliance state comprising:
    identifying sensor data in one or more signals relating to data from one or more sensors associated with an appliance;
    determining an appliance state of the appliance based at least in part on the sensor data;
    determining a response based at least in part on the appliance state; and
    sending the response to at least one of an appliance controller for the appliance or a presentation device, wherein sending the response includes sending a recommendation to the presentation device, wherein the method further includes identifying an indication of whether a user accepted the recommendation.

11. The method of claim 10, wherein identifying comprises identifying sensor data that includes one or more of motion data or temperature data.

12. The method of claim 10, wherein identifying comprises identifying sensor data of an appliance that is a dishwasher, a clothes washer, or a clothes dryer.

13. The method of claim 10, wherein determining the response includes determining a delayed start time based at least in part on a time of day.

14. The method of claim 10, wherein the method further includes revising a user behavior profile based at least in part on the indication.

15. The method of claim 14, wherein the response is a first response and the method further includes:
    determining a second response based at least in part on the revised user behavior profile; and
    sending the second response to at least one of the appliance controller or the presentation device.

16. The method of claim 10, wherein the response is a recommendation for a user action and sending the response includes sending the response to a presentation device.

17. One or more non-transitory computer-readable media comprising instructions that cause a computing device, in response to execution of the instructions by the computing device, to:
    identify sensor data in one or more signals relating to data from one or more sensors associated with an appliance;
    determine an appliance state of the appliance based at least in part on the sensor data;
    determine a response based at least in part on the appliance state; and
    send the response to at least one of an appliance controller for the appliance or a presentation device, wherein the response is a recommendation for a user action and the instructions are also to:
    cause the computing device to send the recommendation to the presentation device; and
    identify an indication of whether a user accepted the recommendation.

18. The one or more non-transitory computer-readable media of claim 17, wherein the sensor data includes one or more of motion data or temperature data.

19. The one or more non-transitory computer-readable media of claim 17, wherein the appliance is a dishwasher, a clothes washer, or a clothes dryer.

20. The one or more non-transitory computer-readable media of claim 17, wherein the instructions are also to cause the computing device to determine a delayed start time based at least in part on a time of day.

21. The one or more non-transitory computer-readable media of claim 17, wherein the presentation device is a visual presentation device.

22. The one or more non-transitory computer-readable media of claim 17, wherein the presentation device is an audio presentation device.

23. The one or more non-transitory computer-readable media of claim 17, wherein the instructions are also to cause the computing device to:

revise a user behavior profile based at least in part on the indication.

\* \* \* \* \*